US007899732B2

(12) United States Patent
Van Beaumont et al.

(10) Patent No.: US 7,899,732 B2
(45) Date of Patent: Mar. 1, 2011

(54) RULES MANAGEMENT SYSTEMS AND METHODS

(75) Inventors: Eric Van Beaumont, Omaha, NE (US);
Jerome A. Bradley, Omaha, NE (US);
Rene' Jeanne LaRose, Omaha, NE (US); Molly Plozay, Omaha, NE (US);
Kerry Ann Miloni Thiele, Omaha, NE (US); Doug Frerichs, Omaha, NE (US);
Stephen M. Meyers, Omaha, NE (US);
James Alan McCarthy, Omaha, NE (US); Kenneth Schwartz, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 627 days.

(21) Appl. No.: 10/271,875

(22) Filed: Oct. 15, 2002

(65) Prior Publication Data

US 2004/0073511 A1 Apr. 15, 2004

Related U.S. Application Data

(60) Provisional application No. 60/362,222, filed on Mar. 4, 2002.

(51) Int. Cl.
*G06Q 40/00* (2006.01)
(52) U.S. Cl. .............................. 705/37; 705/35; 705/36; 705/38
(58) Field of Classification Search .................. 705/40, 705/26, 24, 39, 34, 35–38; 380/24
See application file for complete search history.

(56) References Cited

U.S. PATENT DOCUMENTS

| | | | | |
|---|---|---|---|---|
| 5,283,829 A | * | 2/1994 | Anderson | 705/40 |
| 5,692,132 A | | 11/1997 | Hogan | |
| 5,940,811 A | * | 8/1999 | Norris | 705/38 |
| 5,956,700 A | * | 9/1999 | Landry | 705/40 |
| 6,149,055 A | * | 11/2000 | Gatto | 235/379 |
| 6,374,230 B1 | | 4/2002 | Walker et al. | |
| 6,405,176 B1 | * | 6/2002 | Toohey | 705/26 |
| 7,117,172 B1 | | 10/2006 | Black | |
| 2003/0200172 A1 | | 10/2003 | Randle et al. | |

OTHER PUBLICATIONS

CUETS and First Data Announce Card Issuing & Merchant Processing Agreements, PR Newswire. New York: Oct. 7, 2002. p. 1.*
Hay, David, et al., "Defining Business Rules—What Are They Really?" (The Business Rules Group, formerly, known as the GUIDE Business Rules Project) Final Report, Revision 3, (Jul. 2000).

* cited by examiner

*Primary Examiner*—Alexander Kalinowski
*Assistant Examiner*—Clement B Graham
(74) *Attorney, Agent, or Firm*—Kilpatrick Townsend and Stockton LLP (57) ABSTRACT

A method of providing bankcard services includes receiving at a host computer system information from a client defining an event. The method includes receiving at the host computer system information identifying a condition relating to at least one element associated with bankcard accounts. The method further includes receiving at the host computer system information defining an action to be taken based on the condition upon the occurrence of the event. The method also includes storing the event, the condition, and the action as a business rule at the host computer system.

28 Claims, 9 Drawing Sheets

Bank ABC

402

Standard Market

Annual Fee $25
Late Charge $15
Interest Rate Prime + 9%
Credit Application Plan Default
Presentation Instrument Standard

Premier Program - *New!*

Annual Fee $15
Late Charge $10
Interest Prime Rate + 7%
Credit Application Plan - Default
Presentation Instrument - Premier

404

Vandemark's

Annual Fee: none

PI: Vandemarks

Elite

Promotional Rate: 1% for 3 months from first usage

PI: Elite

Distinction

PI: Distinction

Rules Management

File  Edit  View  Tools  Window  Help

Available Processing Areas

- Policies
- Segmentation Rules
- Processing Area Rules
  - Late Fee Calc and Exclusion
    - $10.00 fee no waiver
    - $15.00 fee waive if state
    - $15.00 fee no waiver
    - $15.00 fee good card waiver
    - $25.00 high risk cardholder
    - Late Fee percentage 10% of balance
    - Late Fee percentage 15% of balance
  - Interest Management
  - Credit Application
  - Annual Fee
- Action Sets
- Formulas

_802_

Test - $10.00 fee no waiver

Account | Results | Process Flow | Decision Elements

Account Number: `111122223334444`   [Browse]
_806_   [Refresh]   [Save]   _804_

Decision Elements

| Name | Value |
|---|---|
| Accumulated Credit Amount | $10.00 |
| Late Fee Formula | (result) |
| Number of Cycles Deliquent | 3 |
| CURBAL | $100.00 |
| Delinquency Dollars Formula | (result) |
| Minimum Payment Percent | 3.0% |
| Minimum Del Amt | $2.00 |

_808_

Simulated Date: `01/17/2002` [📅]

[Apply]   [Cancel]

User/Logon Name | Security Role | DD/MM/YY | HH:MM:SS  AP

Microhelp

Rules Management

File  Edit  View  Tools  Window  Help

Available Processing Areas

Test - $10.00 fee no waiver - Acct1111222233334444

Account | Results | Process Flow | Decision Elements

Path:

Rule simulation only

$10.00 fee no waiver

Criteria $10.00 fee no waiver:

if (Acc Credit Amount {$10.00} < late fee formula {$6.00})  — 816  X false ✓ true
and (Cycles Deliquent {3} > 2)
then ACTION $10 fee no waiver  — 818  X false

- ⊞ ☐ Policies
- ⊞ ☐ Segmentation Rules
- ⊟ ▽ Processing Area Rules
  - ⊟ ▽ Late Fee Calc and Exclusion
    - ▦ $10.00 fee no waiver
    - ▦ $15.00 fee waive if state
    - ▦ $15.00 fee no waiver
    - ▦ $15.00 fee good card waiver
    - ▦ $25.00 high risk cardholder
    - ▦ Late Fee percentage 10% of balance
    - ▦ Late Fee percentage 15% of balance
  - ⊞ ☐ Interest Management
  - ⊞ ☐ Credit Application
  - ⊞ ☐ Annual Fee
- ⊞ ☐ Action Sets
- ⊞ ☐ Formulas

802

Apply    Cancel

Microhelp | User/Logon Name | Security Role | DD/MM/YY | HH:MM:SS | AP

RULES MANAGEMENT SYSTEMS AND METHODS

CROSS-REFERENCES TO RELATED APPLICATIONS

This application is related to U.S. Provisional Patent Application Ser. No. 60/362,222, entitled, "METHOD AND SYSTEM FOR PROCESSING CREDIT CARD RELATED TRANSACTIONS," by Peter M. Zelechoski, et al., on Mar. 4, 2002, which application is incorporated herein by reference in its entirety.

BACKGROUND OF THE INVENTION

The present invention relates generally to credit card processing services. The present invention relates more particularly to systems and methods that permit credit card processing organizations to use rules-based systems to design and administer credit card programs.

The birth of a credit card generally begins with an applicant supplying information to complete a credit card application provided by an issuer. The issuer is usually a financial institution that issues the credit card and extends credit to the cardholder through the credit account linked to the credit card. Typically, the process of supplying the necessary information can be done electronically or by paper. The credit card application is then processed, and if approval criteria are met, a credit card is issued to the applicant who now becomes a cardholder. The process of issuing a credit card involves a number of steps including, for example, coding the credit card with cardholder data on the magnetic stripe and embossing the cardholder's name, account number and expiration date on the credit card.

When the credit card is first received by the cardholder, the cardholder needs to activate the credit card. Activation of the credit card is generally done by requiring the cardholder to call the issuer from his/her home phone. Once the credit card is activated, the cardholder may then use the credit card to make purchases or conduct transactions.

A typical credit card transaction involves a number of parties. In addition to the cardholder and the issuer, the parties involved in a credit card transaction include a merchant, an acquirer and a credit card association such as Visa or MasterCard. The acquirer is a business entity, e.g., a commercial bank, that has a business relationship with the merchant and handles credit card transactions from that merchant.

A typical credit card transaction involves the following steps. First, the merchant calculates the amount of the transaction or purchase and seeks payment from the cardholder. The cardholder then presents the merchant with his/her credit card. The merchant then runs the credit card through a point of sale terminal. The point of sale terminal captures credit card and sales information and sends such information together with an authorization request to the acquirer. The acquirer, in turn, processes the information received from the point of sale terminal and forwards any relevant information and the authorization request to the issuer. The issuer processes the relevant information and the authorization request to determine whether the transaction should be authorized. The issuer then sends an approval or denial code back to the acquirer. The acquirer relays the approval or denial code to the point of sale terminal for use by the merchant. If the transaction is authorized, the cardholder is allowed to consummate the transaction with the merchant. Typically, at a later time, the accounts maintained by the issuer and the acquirer are settled and reconciled. The end result is that the issuer transfers the transaction amount minus a fee to the acquirer. The acquirer then deducts a fee from the amount received from the issuer. The remaining amount is then transferred by the acquirer to the merchant's account.

While certain parties, such as the issuer and the acquirer, are described above as performing certain functions, in typical situations, most or all of the functions to be performed by these parties may be performed on their behalf by third parties. For example, in some instances the third party may be a credit card processing organization. The credit card processing organization may provide credit card processing services on behalf of many clients, such as banks, or other financial institutions, and the like, who wish to issue credit accounts to their customers. The credit card processing organization may receive and process credit card applications, issue credit cards, receive user account information relating to a transaction, approve and process the transaction information, and provide payment to the merchant. Periodically, the credit card processing organization produces financial statements that summarize transactions for customers and bill the customers at least a minimum amount based upon their usage of the credit account. One example of a credit card processing organization is First Data Corporation, Greenwood Village, Colo.

In order to establish services with a wide variety of clients, credit card processing organizations need to design credit card programs to satisfy many potential card holders. Credit processing organizations also need systems that efficiently administer such a wide variety of programs. The present invention relates to systems and methods that satisfy these needs.

BRIEF SUMMARY OF THE INVENTION

Embodiments of the present invention thus provide a method of providing bankcard services. The method includes receiving at a host computer system information from a client defining an event, receiving at the host computer system information identifying a condition relating to at least one element associated with bankcard accounts, receiving at the host computer system information defining an action to be taken based on the condition upon the occurrence of the event, and storing the event, the condition, and the action as a business rule at the host computer system. The method may include collecting bankcard transaction data, and processing the bankcard transaction data using the business rule such that, upon the occurrence of the event, the action is taken with respect to bankcard accounts that satisfy the condition. The method also may include collecting bankcard account data, and processing the bankcard account data using the business rule such that, upon the occurrence of the event, the action is taken with respect to bankcard accounts that satisfy the condition. The operation of receiving information identifying a condition may include receiving a logical expression using the at least one element. The at least one element may be derived from one or more account attributes. The one or more account attributes may be selected from a group consisting of state of residence, base interest rate, current, previous, and last balance, delinquency, client-defined fields, payment history, and promotional information. The event may be selected from a group consisting of statement processing, new processing day, monetary posting, non-monetary posting, monetary adjustment, specified day, account transfer, and account creation. The action may be selected from a group consisting of set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a masterfile field, call another rule, assign or remove an identifier, set account limits or thresholds, insert information into a statement, print a message, generate a plastic, and change a credit line. The action may result in a change to an account attribute. The business rule may be selected from a library of business rules. The method also may include collecting bankcard data and running a simulation of the business rule using the bankcard data such that upon the occurrence of the event, information identifying the action is written to a file with respect to bankcard accounts that satisfy the condition.

In other embodiments, a method of providing bankcard services includes receiving at a host computer system a selection of a business rule from a library of business rules. The business rules may include information defining an event, a condition relating to at least one element associated with bankcard accounts, and information defining an action to be taken based on the condition upon the occurrence of the event. The method also may include storing the selection at the host computer system, collecting bankcard data, and processing the bankcard data using the business rule such that, upon the occurrence of the event, the action is taken with respect to bankcard accounts that satisfy the condition.

In still other embodiments, a method of providing bankcard services includes receiving at a host computer system a selection of a business rule from a library of business rules. The business rules may include information defining an event, a condition relating to at least one element associated with bankcard accounts, and information defining an action to be taken based on the condition upon the occurrence of the event. The method also may include storing the selection at the host computer system, collecting bankcard data, and running a simulation of the business rule using the data such that upon the occurrence of the event, information identifying the action is written to a file with respect to bankcard accounts that satisfy the condition.

In yet other embodiments, a computer-readable medium having computer-executable instructions for performing a method includes receiving from a client information defining an event, receiving information identifying a condition relating to at least one element associated with bankcard accounts, receiving information defining an action to be taken based on the condition upon the occurrence of the event, and storing the event, the condition, and the action as a business rule. The method also may include collecting bankcard transaction data, and processing the bankcard transaction data using the business rule such that, upon the occurrence of the event, the action is taken with respect to bankcard accounts that satisfy the condition. The method also may include collecting bankcard account data, and processing the bankcard account data using the business rule such that, upon the occurrence of the event, the action is taken with respect to bankcard accounts that satisfy the condition. The operation of receiving information identifying a condition may include receiving a logical expression using the at least one element. The at least one element may be derived from one or more account attributes. The one or more account attributes may be selected from a group consisting of state of residence, base interest rate, current, previous, and last balance, delinquency, client-defined fields, payment history, and promotional information. The event may be selected from a group consisting of statement processing, new processing day, monetary posting, non-monetary posting, monetary adjustment, specified day, account transfer, and account creation. The action may be selected from a group consisting of set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a masterfile field, call another rule, assign or remove an identifier, set account limits or thresholds, insert information into a statement, print a message, generate a plastic, and change a credit line. The action may result in a change to an account attribute. The business rule may be selected from a library of business rules. The method also may include collecting bankcard data, and running a simulation of the business rule using the bankcard data such that upon the occurrence of the event, information identifying the action is written to a file with respect to bankcard accounts that satisfy the condition.

In other embodiments, a system for providing bankcard services includes a processor, a storage device, and an output device. The processor may be configured to receive from a client information defining an event, receive information identifying a condition relating to at least one element associated with bankcard accounts, receive information defining an action to be taken based on the condition upon the occurrence of the event, and store the event, the condition, and the action as a business rule. The processor may be further configured to collect bankcard transaction data, and process the bankcard transaction data using the business rule such that, upon the occurrence of the event, the action is taken with respect to bankcard accounts that satisfy the condition. The processor also may be configured to collect bankcard account data, and process the bankcard account data using the business rule such that, upon the occurrence of the event, the action is taken with respect to bankcard accounts that satisfy the condition. The information identifying a condition may include a logical expression using the at least one element. The at least one element may be derived from one or more account attributes. The one or more account attributes may be selected from a group consisting of state of residence, base interest rate, current, previous, and last balance, delinquency, client-defined fields, payment history, and promotional information. The event may be selected from a group consisting of statement processing, new processing day, monetary posting, non-monetary posting, monetary adjustment, specified day, account transfer, and account creation. The action may be selected from a group consisting of set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a masterfile field, call another rule, assign or remove an identifier, set account limits or thresholds, insert information into a statement, print a message, generate a plastic, and change a credit line. The action may result in a change to an account attribute. The business rule may be selected from a library of business rules. The processor also may be configured to collect bankcard data, and run a simulation of the business rule using the bankcard data such that upon the occurrence of the event, information identifying the action is written to a file with respect to bankcard accounts that satisfy the condition.

In other embodiments, a method of providing bankcard services includes receiving from a client an if-then statement that includes information defining an event, storing the if-then statement as a business rule. The if portion of the statement may include a condition relating to at least one element associated with bankcard accounts, and the then portion of the statement may define an action to be taken based on the condition upon the occurrence of the event.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

The present invention provides systems and methods that permit clients of credit card processing organizations to design credit card programs in a user friendly environment and that permit credit card processing organizations to efficiently administer such programs. Many credit card accounts in are administered by credit card processing companies. Herein, such processing companies are referred to as credit card processing organizations or simply processing organizations. Processing organizations administer credit card accounts on behalf of banks, retailers, financial institutions, and other business that wish to issue credit cards according to guidelines established by such businesses. Herein, such businesses are referred to as clients, as in clients of the processing organization. Credit card account owners are referred to herein as account owners or customers, as in customers of the clients of the processing organizations. Finally, herein "merchants" refers to a business that accepts credit cards as payment for merchandise or services.

In order to provide better service to their clients, processing organizations desire to provide their clients with as much flexibility as possible to design their credit card programs. Providing more efficient tools for developing credit card programs allows processing organizations to cost effectively provide this increased flexibility. Further, processing organizations also desire to decrease their own costs. Thus, tools that make credit card data processing more efficient are desirable. The present invention relates to such a tool.

Figure 1:
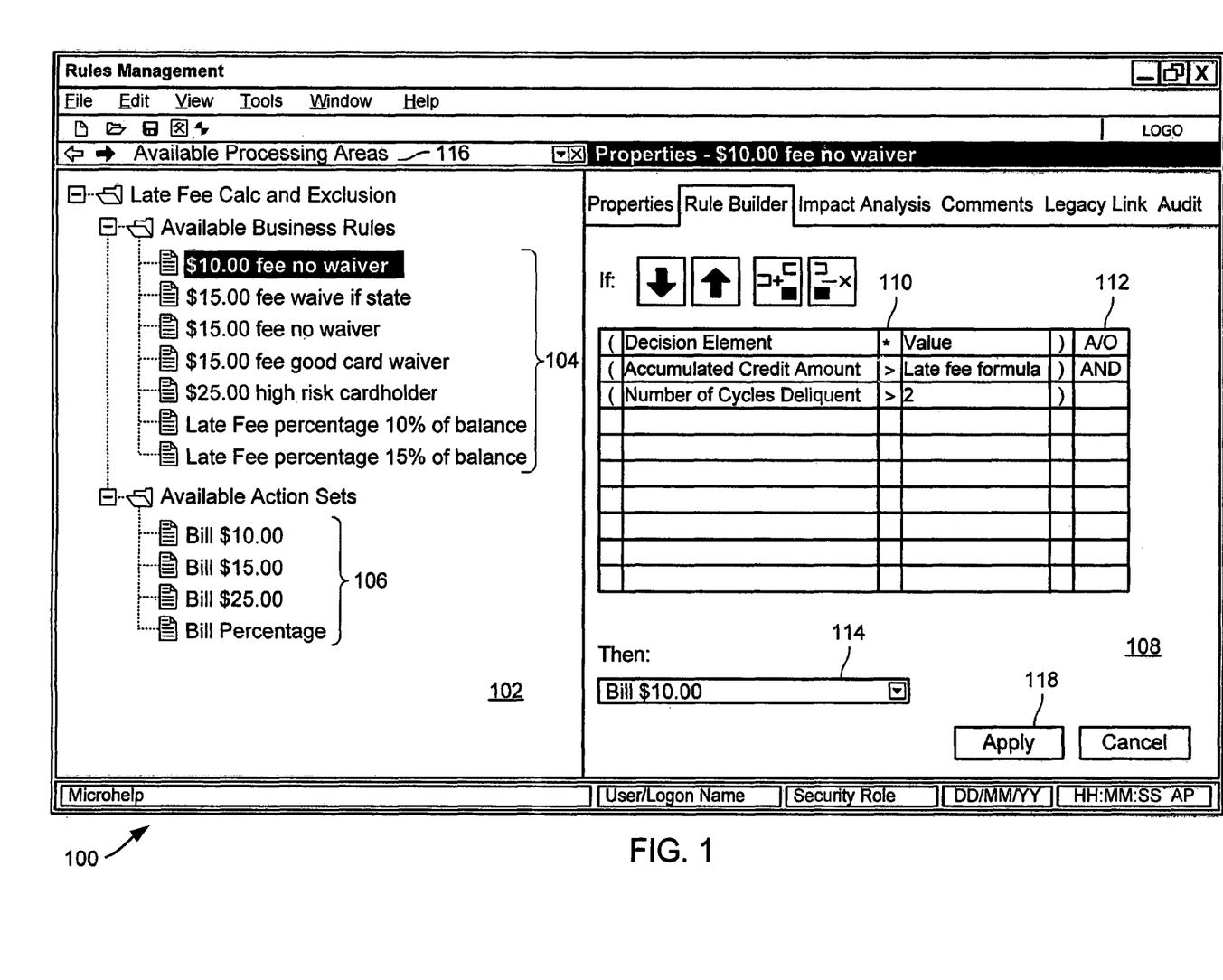
FIG. 1 illustrates a first screen display in a rules management system according to the present invention.

FIG. 1 illustrates a first screen display 100 in a system for managing rules in a credit card processing environment. The system architecture will be explained in more detail hereinafter; however, the screen display 100 illustrates a number of important aspects of the present invention. A client of a credit card processing organization might encounter the display screen 100 while designing a credit card program for its customers. As will be explained, the client may interface with the system using a computer connected to a network, such as the Internet. A software application resident on the client's computer may generate the user interface through which the client interacts with the rules management system. The application may be a standard web browser. Alternatively, the application may be a custom application that generates a user interface having windows such as the screen display 100. Many other examples are possible and apparent to those having skill in the art.

Through the user interface, the client may select or design "rules" that define the credit card program the client wishes to offer its customers. A rule is a conditional statement based on variables within the credit card processing environment. In one embodiment, the conditional statements are "If-Then" statements that produce an "action" when the conditional statement is satisfied. In a navigation pane 102, the screen display 100 includes a list of available rules in the late fee calculation area. A first list 104 includes the conditional portion of the rule, and a second list 106 includes the actions that may be taken when the condition is satisfied. Actions may include set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a masterfile field, call another rule, assign or remove an identifier, set account limits or thresholds, insert information into a statement, print a message, generate a plastic, change a credit line, and the like. A work area 108 provides additional definition of the rule.

The variables upon which the rules operate are "account attributes" and "elements." For example, an account attribute may include the state in which a customer resides. This is an important account attribute because the laws in the customer's state may dictate certain bounds within which the client's program operates, such as the maximum interest rate the client may apply to its customers' account balances. Other account attributes may include state of residence, base interest rate, current, previous, and last balance, delinquency, client-defined fields, payment history, promotional information, and the like. Rules may also operate on elements, which are combinations of account attributes. For example, "minimum payment due" may be an element that is a combination of a "minimum payment due percentage" and the customer's account balance. Many other elements are used in the rules management system. Rules also may include "formulas" based on account attributes, elements, and other variables.

In the example illustrated in FIG. 1, as shown in the work area 108, the selected rule "$10.00 fee no waiver" relates to billing a late fee. In this rule, the conditional statement is based on the attribute "number of cycles delinquent," the element "accumulated credit amount," and the formula "late fee formula." The conditional statement is satisfied, or true, when "accumulated credit amount" is greater than "late fee formula" and "number of cycles delinquent" is greater than 2. The conditional operators in the formula, shown in the column 110, may include > (greater than), < (less than), = (equal to), >= (greater than or equal to), <= (less than or equal to), <> (not equal to), / (not), and the like. Other conditional operators are possible. The conditional conjugates in the formula, shown in the column 112, may include AND, OR, NOT, and the like. The action "Bill $10.00" appears in the action field 114. In this example, when the conditional statement is true, $10 is added to the customer's account balance. Thus, a rule may result in a change to an account attribute or element, as in this example, wherein the rule changes the account balance attribute.

Rules are designed to be evaluated upon the occurrence of "events." In the present example, the event, "statement processing" triggers evaluation of the "$10.00 fee no waiver" rule. Other events might include, new processing day, monetary posting, non-monetary posting, monetary adjustment, specified day, account transfer, account creation, account anniversary, and the like. Thus, upon the occurrence of an event, rules triggered by the event are evaluated, and, if satisfied, result in the action associated with the rule. This combination of event-rule-action may be referred to herein as a "business rule."

As will be explained further below, prior to processing rules, the account and transaction data upon which the rules operate may be "segmented." Segmentation may occur based on particular account attributes, elements, and the like.

A collection of rules that define a credit card program constitute a "policy." Thus, according to the present invention, a credit card processing organizations may provide its clients with a user interface through which the client may select or design rules that form a policy detailing the credit card program the client will offer its customers. Account and transaction data relating to customers of the client are then processed by the credit processing organization according to the policy. The process will be explained in more detail hereinafter.

Figure 2:
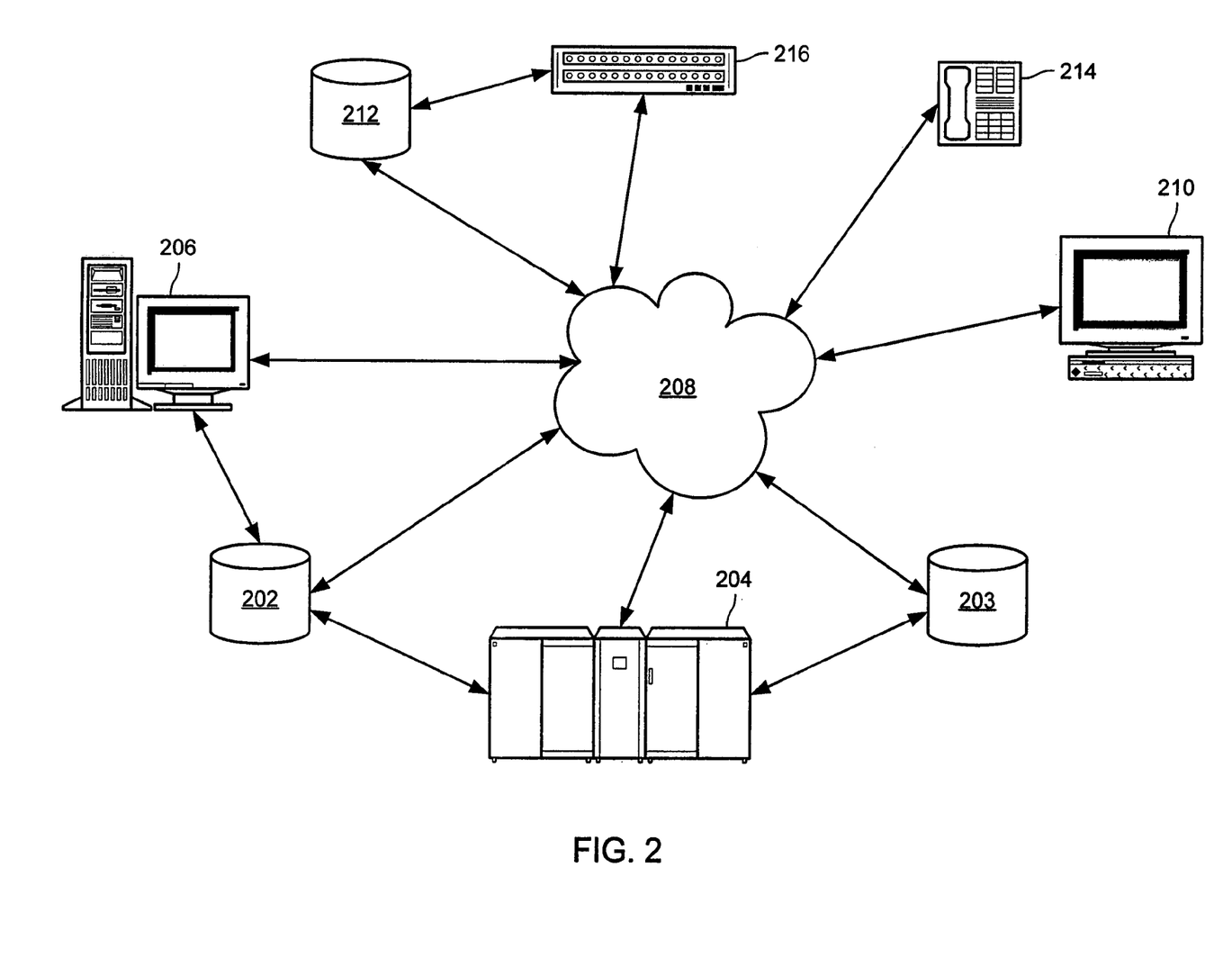
FIG. 2 is a system for managing rules according to the present invention.

Referring now to FIG. 2, one example of a system 200 for managing rules in a credit card processing environment will be described. The system 200 is merely one of many possible embodiments of a system according to the present invention. Those skilled in the art will recognize many different equivalent configurations within the scope of the present invention. Thus, this example of the present invention is not to be considered limiting. The system 200 includes a rules database 202, an account attribute database 203, an application server 204, and a web server 206. The rules database 202, the account attribute database 203, the application server 204, and the web server 206 may be separate elements of the system 200, as shown, or the components may reside together within a single computing device. In some embodiments, the rules database 202, the account attribute database 203, the application server 204, and the web server 206 are collocated within a single facility, while in other embodiments the components are distributed geographically and in communication either directly, as shown, or through a network 208, also shown.

The rules database 202 and the account attribute database 203 each may be any suitable computing device that includes an electronic storage arrangement. Suitable computing devices include personal computers, work stations, mainframes, servers, and the like. Suitable electronic storage arrangements include magnetic storage media, such as tape or disk drive systems, optical storage media, such as CD ROM and DVD, and solid state storage systems, such as RAM. The rules database 202 and the account attribute database 203 each may be configured with software that provides for the storage and retrieval of electronic information. The software may be well-known, commercially available software, such as Microsoft Access, SQL, DataBase II, Oracle, and the like, or the software may be custom-designed software.

The application server 204 also may be any suitable computing device, such as a mainframe computer, a workstation, a server, a personal computer, and the like. The application server 204 may include a large capacity storage system, such as those described above with reference to the rules database 202 and the account attribute database 203. Alternatively or additionally, the application server 204 may rely on the rules database 202, the account attribute database 203, and/or other storage environment for large capacity storage requirements. Other examples are possible.

The web server 206 also may be any suitable computing device, such as a mainframe computer, a workstation, a server, a personal computer, and the like. The web server 206 also may include suitable electronic storage, such as described above with reference to the rules database 202. The web server 206 may be configured with software that provides an electronic interface, via the network 208, for external clients or internal users of the rules management system 200. In some embodiments, the web server 206 includes software that provides a security/authentication function that ensures clients attempting to access the rules management system 200 are valid clients. Some embodiments of the web server 206 also include software that monitors client software being used to access the rules management system 200 and provides the opportunity to update the software as necessary.

The network 208 may be any suitable electronic network. For example, the network may be the Internet, a local area network, a wide area network, an Ethernet, a virtual private network, and the like. Through the network 208, clients may access the system 200 via a client computer 210. The client computer 210 may be any suitable computing device such as a mainframe computer, a workstation, a server, a personal computer, and the like. The client computer 210 may be configured with software, such as web browser software, that allows the client computer 210 to access the web server 206, and other parts of the rules management system 200. Alternatively, the client computer 210 may be configured with custom application software designed specifically for operation with the rules management system 200. As mentioned above with respect to the web server 206, the web server 206 may include software that monitors the custom application software on the client computer 210 and provides updates as necessary. Other examples are possible.

The system 200 also includes a transaction database 212 that may be any of the suitable computing and/or storage arrangements discussed previously. The transaction database 212 collects and stores transaction records that originate with merchants. For example, when a merchant accepts a credit card as payment for goods or services, the merchant generates a transaction record and transmits the transaction record to the merchant's bank. The merchant may use devices such as the telephone transaction arrangement 214, the terminal transaction arrangement 216, and the like, to transmit transaction records. Although shown as merely a database connected to the network 208, the transaction database 212 may be a collection of databases and systems that collect and distribute transaction records. For example, as mentioned above, the merchant may transmit the transaction record to the merchant's bank, which in turn transmits it to the appropriate credit card organization, such as Visa or MasterCard. The credit card organization may then transmit the transaction record to the processing organization that processes transactions on behalf of the client that issued the credit card used in the transaction that resulted in the transaction record. According to this embodiment of the present invention, the transaction database 212 represents a storage medium that stores transaction records to be processed according to the rules within the rules management system 200.

Figure 3:
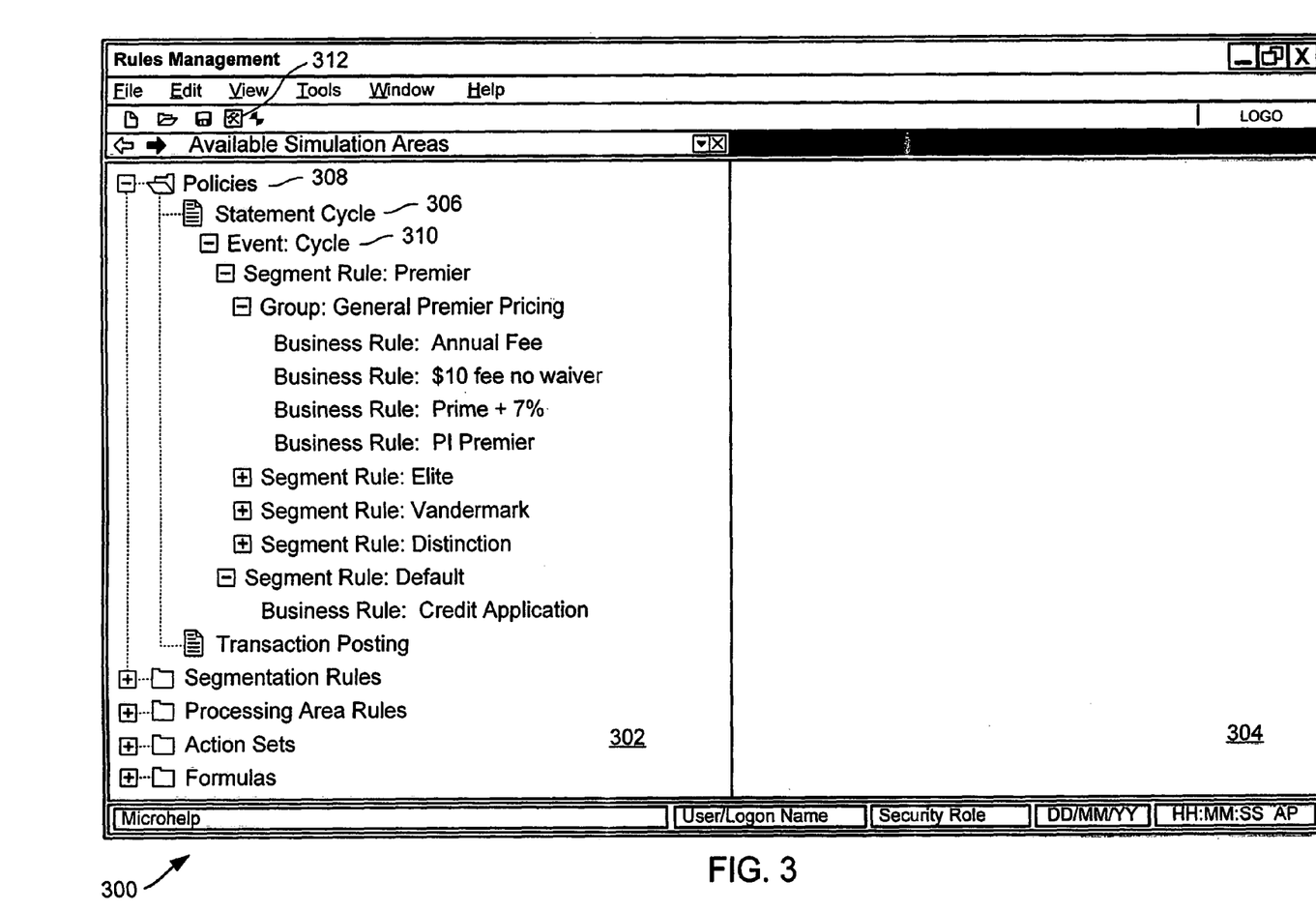
FIG. 3 illustrates a second screen display in a rules management system according to the present invention.

Attention is now directed to FIG. 3, which illustrates a second screen display 300 in a system for managing rules in a credit card processing environment. A client may encounter such a screen display when designing a credit card program according to the present invention. A rules tree window 302 logically groups the business rules that constitute a credit card program using known symbology. In brief, the higher branches of the tree are represented by the least-indented lines. The more indented the line, the further down the tree hierarchy the item. A plus (+) or minus (−) sign preceding an item indicates whether the branch is collapsed or expanded, respectively. Selecting a line in the tree causes detailed information relating to the line to be displayed in the work area 304.

Under a "policies" branch 308 of the rules tree, rules are organized first by events, then by segments, then by business rules. Thus, in this example, two events are listed: statement cycle and transaction posting (although in this example, no rules are listed under transaction posting, the header "Transaction Posting" is available). Under the branch heading "Event: Cycle" 310 of the tree, a number of segment rules appear. The two higher level segment rules are "Premier" and "Default." Thus, upon processing data for a statement cycle (the event that triggers execution of rules in the "Cycle" branch of the tree), data is first segmented according to the "Premier" and "Default" rules. Processing will be explained in more detail hereinafter. The logic behind this grouping of rules will be clearer in light of the following example with reference to FIG. 4.

Figure 4:
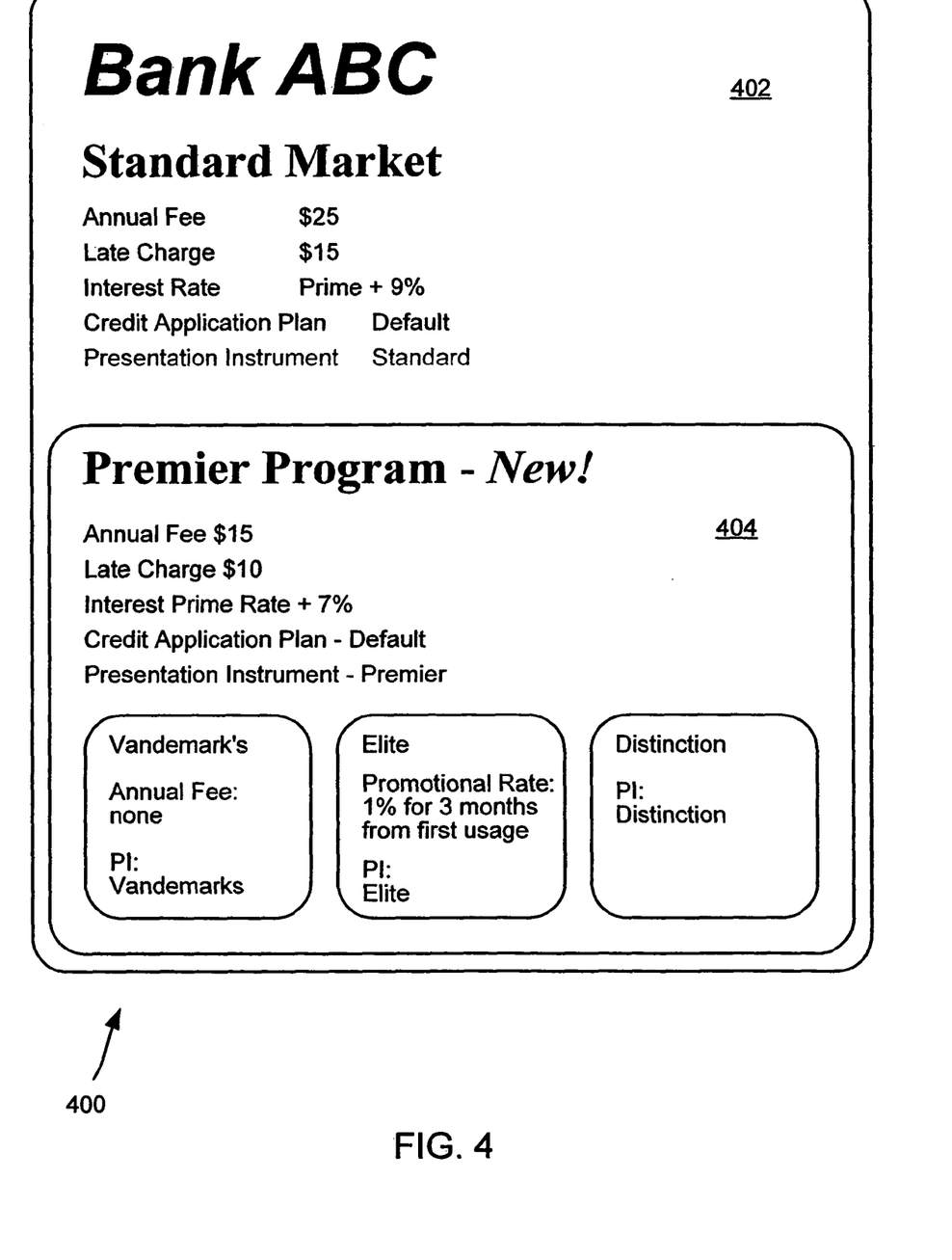
FIG. 4 is a credit card program that may be implemented using the system of FIG. 2.

FIG. 4 illustrates a hypothetical credit card program 400 to be offered by Bank ABC, a client of a processing organization using the present invention. In this hypothetical example, Bank ABC currently offers a "Standard Market" credit card program having the attributes listed in the standard market window 402. The attributes include an annual fee of $25, a late fee of $15, and an interest rate of "Prime+9%." Bank ABC wishes to design a new credit card program within its existing program. The new program will have several "levels" for different of ABC's customers. The "Premier Program," having the attributes listed in the premier program window 404, will form the basis of the plan. Within the Premier Program, three subprograms will be offered: Vandemark, Elite, and Distinction. The subprograms will have the additional or alternative attributes listed in the subprogram windows V, E, D, respectively. The attributes of the Premier, Vandemark, Elite, and Distinction programs determine how credit card data will be processed for customers in each of the programs. Thus, when designing the program using the present invention, ABC Bank will organize the business rules according to the program levels.

Attention is now directed to FIG. 3 in combination with FIG. 4. As stated previously, business rules listed under the event "Cycle" perform segmentation of customer data according to the program within which the customer falls. One of the attributes in each customer's data file will relate to the customer's credit card program. Thus, the first segment rule "Premier" causes the business rules that fall under it in the tree hierarchy to operate on data relating to customers in the Premier program. Other data may be processed according to the rules under the "Default" segmentation rule branch of the tree. Within the Premier branch of the tree, customer data may be further segmented for processing according to the Elite, Vandemark, and Distinction segmentation rules. The plus sign (+) in front of each of these segmentation rules indicates that the associated branch is displayed in collapsed view, while the minus sign (−) in front of the Premier segmentation rule, and more particularly in front of the "General Premier Pricing" group, indicates that the business rules associated with the Premier program are displayed in the expanded view. A group allows a user to define sets of processing area rules that the user would like associated with an event or a segmentation action. This simplifies set up for new marketing programs and ensures consistency across portfolio processing.

Under the General Premier Pricing group branch of the tree, several business rules are listed that would be used to generate actions during statement processing (the event) if the conditions in the rule are satisfied. One of these business rules "$10 fee no waiver" will be explained further below.

FIG. 3 also illustrates several branches outside the Policy branch in the tree hierarchy. These include: Segmentation Rules, Processing Area Rules, Action Sets, and Formulas. Each is shown in the collapsed view. These branches may be considered libraries of rules, actions, and formulas from which clients can select the building block of their policies. Thus, clients may select predesigned business rules, modify rules in the library, or create their own rules. For example, the "$10 fee No Waiver" rule may be a predesigned rule in the library, which the client can include in a policy as is, or modify, as will be explained. An icon, such as the rule builder icon 312 may be used to initiate the construction of a rule from scratch, in which case the client has the flexibility to complete all the data fields in the work area 108 discussed in more detail below.

Attention is redirected to FIG. 1 for a discussion of the rule building process. As discussed previously, FIG. 1 illustrates a screen display 100 a client might encounter while creating or selecting rules that define a policy, or credit card program. The rules listed in the navigation pane 102 are a portion of the Processing Area Rules branch of the tree hierarchy discussed above with reference to FIG. 3. This is indicated by the navigation line 116 of the navigation pane 102. Continuing with the hypothetical example discussed above, the screen display 100 depicts what a client might see while designing a rule relating to late fee calculations in the Premier program. By entering information into the various fields in the work area 108, the client is able to customize a rule that determines the method by which a customer's late fee is calculated. The building blocks of the rule may be selected from various branches in the tree hierarchy. Once the rule is constructed, it can be incorporated into the tree by selecting the "Apply" icon 118. Then, as discussed above with reference to FIG. 3, the rule may be referenced under a policy, as was the case with the "$10 fee no waiver" rule under the policy designed by ABC Bank. The policy may be stored at the rules database 202 of FIG. 2 for later use in the processing environment.

In addition to the hierarchy of rules discussed thus far, some embodiments provide for the selection and creation of policy-wide rules that are not necessarily event-triggered. These rules may, for example, evaluate all actions prior to execution and alter the action under certain circumstances. For example, suppose a particular processing event results in two, seemingly contradictory actions. In the first action, a business rule has determined that a customer has been actively using a credit card account for more than one year, which, according to the rule, entitles the customer to a reduction in interest rate of 1% for his loyalty. However, in the second action, a different business rule has determined that the same customer has been late in paying his bill for each of the last two months. A "global" rule may be created by the client or selected from the library that compares all actions being taken with respect to a particular account and corrects any actions that contradict other actions. In this case, the global rule may prevent the late-paying customer from receiving the interest rate reduction. Many other examples of global rules are possible, and this example is not to be considered limiting.

The foregoing discussion represents but one example of a process for creating, selecting, displaying, and organizing rules according to the present invention. Many other examples are possible and apparent to those having skill in the art. For example, some embodiments of the present invention may use a series of nested folders to display and represent the hierarchical relationship of rules within a policy. Other embodiments may represent the rules as tables in a relational database, macros in a spread sheet, or any combination of the foregoing. Thus, this example of the present invention is not to be considered limiting.

Figure 5:
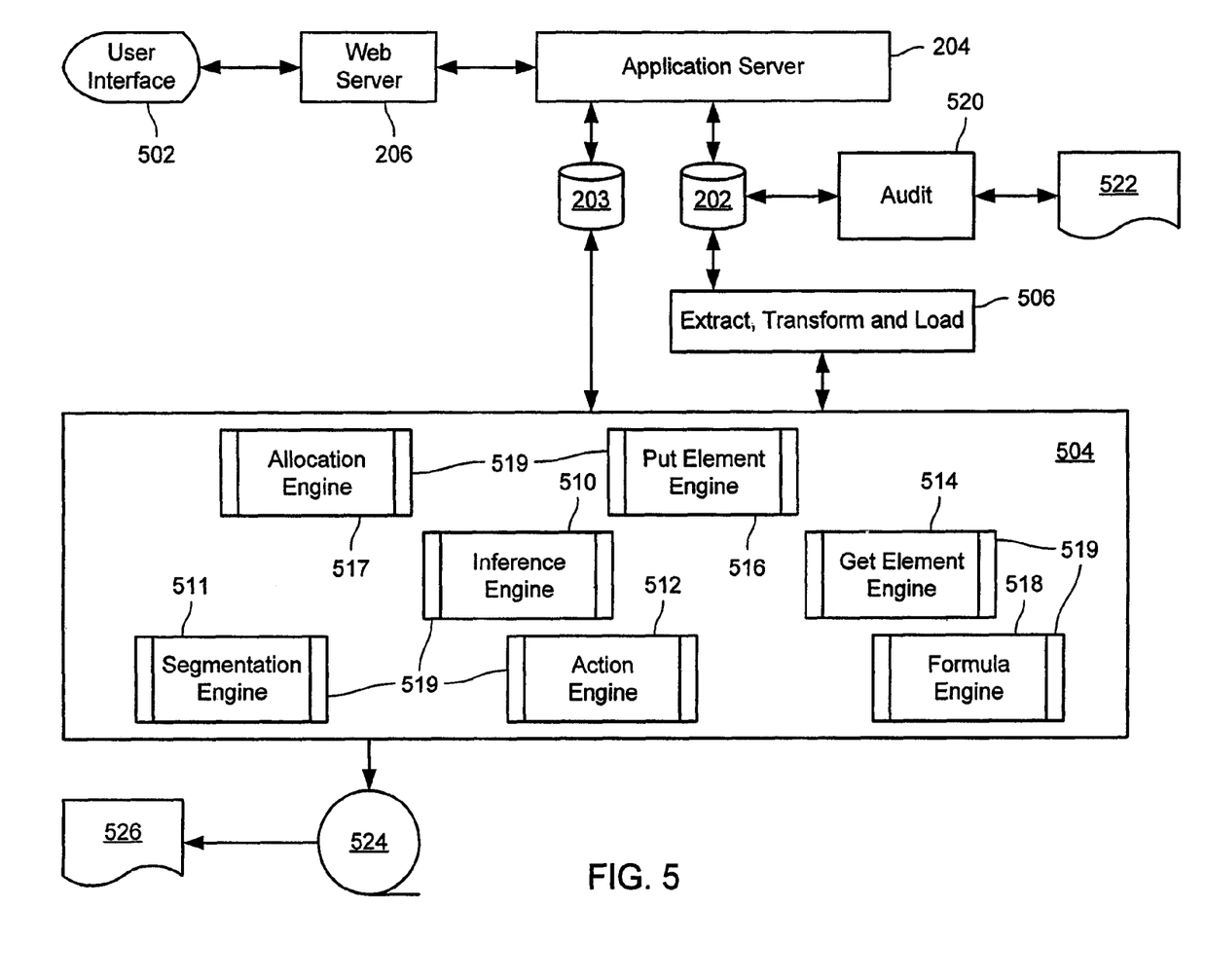
FIG. 5 is a processing environment according to embodiments of the present invention.

Having described the process for creating rules according to the present invention, attention is now directed to FIG. 5 for a discussion of the process by which the rules are used to process customer account and transaction data according to the present invention. FIG. 5 illustrates a processing environment 500, which includes a more detailed view of a portion of the system 200 described with respect to FIG. 2. As can be seen, the processing environment 500 includes a user interface 502 (which is analogous to the client computer 210 of FIG. 2), the web server 206, the application server 204, the rules database 202, and the account attribute database 203. Additionally, the processing environment 500 includes a processing area 504 within which the rules operate on customer account and transaction data. The processing environment 500 may reside within the application server 204, or any other suitable computing environment. The processing environment 500 represents a batch process.

The batch process depicted in FIG. 5 may be executed upon the occurrence of a particular event. For example, on the day for generating statements, a batch process may be executed to produce statements for each customer. In another example, at the end of a period of time, such as a day, accumulated transactions may be processed for posting to customers' accounts. In some embodiments, the batch process is not related to any particular event but is executed periodically to process data relating to any event that has occurred in the preceding period. The processing environment 500 includes an ETL process 506 (Extract, Transform, and Load) wherein rules are removed (extracted) from the rules database 202 and converted (transformed) from the format in which the rules are stored on the rules database 202 into the format in which the rules are used for processing data. The rules are then placed (loaded) into the processing area 504 of the processing environment 500. The rules may be stored, for example in DB2 (DataBase II) code, and converted into VSAM (Virtual Storage Access Method) code for processing. Other processing techniques also may be used.

The processing area 504 includes a number of processing engines: an inference engine 510, a segmentation engine 511, an action engine 512, a get element engine 514, a put engine 516, an allocation engine 517, and a formula engine 518. Each engine is designed for a particular function relating to the processing of customer account and transaction data according to the rules. The inference engine 510 resolves the conditional portion of rules relating to customer account and transaction data. The segmentation engine matches customer account and transaction data to the appropriate client policy and the appropriate segment within the policy. For example, the data being processed by the processing organization in a given batch is not necessarily limited to a single client. Thus, the data must be matched to the appropriate client and then to the appropriate credit card program of the client. The action engine 512 manages the process of resolving the action portion of the business rules. It cooperates with the put engine 516 which actually accomplishes the updating of any account attributes affected by the process. The get element engine 514 extracts elements and attributes used in the processing of customer account and transaction data. The allocation engine 517 resolves issues relating to the allocation of payments received from customers. For example, if a customer has balances in different categories (e.g., subject to different interest rates), then the allocation engine 517 may be used to determine to which balance categories a payment should be posted. The formula engine 518 resolves any formulas used in the conditional portion of the rules.

The processing engines each include a data access layer 519 that provides an interface to each engine and the data being processed. For example, the data access layer 519 of the interface engine 510 may pull transaction data from the transaction database 212 (FIG. 2), customer account data from the account attribute database 203, and the like. Other examples are possible.

The processing environment 500 also includes an audit function 520. The audit function 520 monitors extractions, updates, and other functions relating to the rules database 202 and generates an audit report 522. For example, in some embodiments, the audit function 520 produces a report of all rules added to the database, and all rules rolled into and out of production during a period of time and associates them with particular batch processes and/or job numbers.

The processing environment 500 also includes a performance measurement function 524. The performance measurement function 504 receives data relating to various metrics from the processing area 508 and generates a performance measurement report 526 that may be used to monitor the efficiency and operability of the system. For example, in some embodiments, the performance measurement function 524 reports on all account attributes changed during a particular batch process.

Figure 6:
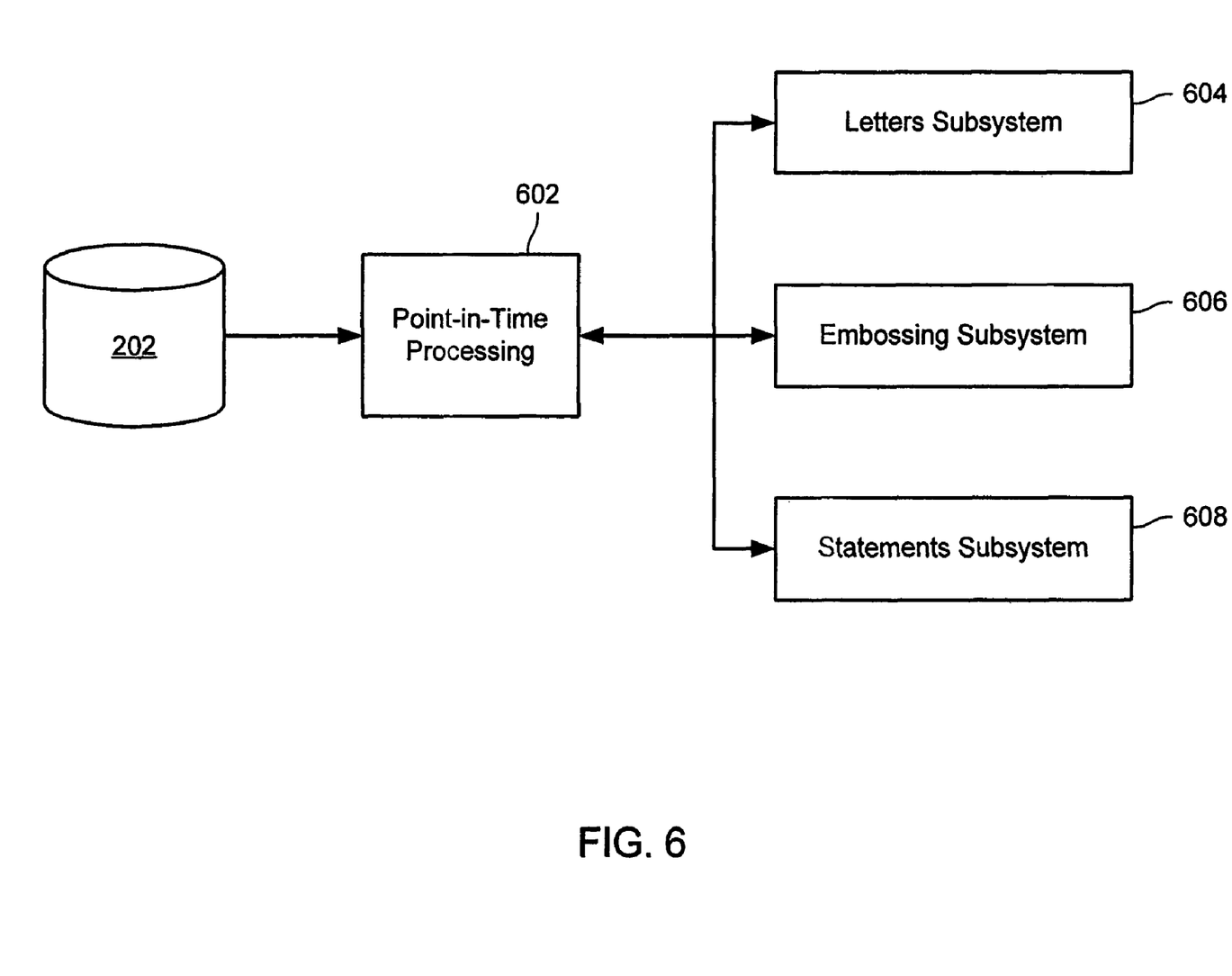
FIG. 6 is a point-in-time processing environment according to embodiments of the present invention.

Attention is directed to FIG. 6 which illustrates a "point-in-time" processing environment 600. In addition to operating in batch mode, the rules management system may operate upon demand in a point-in-time processing mode. The "point-in-time" processing environment 600 includes the rules database 202, a point-in-time processing area 602, and several subsystems. These include a letters subsystem 604, an embossing subsystem 606, and a statement subsystem 608. Other embodiments include other subsystems. The letters subsystem 604 may generate correspondence to card holders, merchants, clients, and other entities. The embossing subsystem 606 prepares credit cards for customers. The statement subsystem 608 distributes credit card statements to customers.

The point-in-time processing area 602 and the subsystems 604, 606, 608 may reside on the application server 204 or other suitable computing device. The point-in-time processing area 602 accesses the rules database directly, without the need for an ETL process 506 (FIG. 5). In some embodiments, the point-in-time processing area 602 does not affect account attributes and operates only on data, such as account statement data files, that resulted from a prior batch process.

As an example of a point-in-time process, consider a customer initiating a new account with the client. The customer may have received a notice in the mail inviting the customer to apply by phone for a credit card account, such as the Premier account in the previous examples. The letters subsystem 604 may have participated in the generation of the notice. The customer may call a customer service representative who initiates a point-in-time process utilizing the embossing subsystem 606 to prepare a credit card with the customer's name and account number. The point-in-time processing area 602 extracts the data needed for account initiation, receives data from the customer service representative, and transmits information identifying the resulting actions to the embossing subsystem 606. Other examples of point-in-time processes are more fully explained in copending U.S. patent application Ser. No. 10/109,459, entitled, "System for Card Processing, Embossing & Fulfillment" by Sharon K. Hogan, et al. filed on Mar. 26, 2002, and in copending U.S. patent application Ser. No. 10/108,806, entitled, "Method and Systems for Processing Card Reissue Transactions," by Rebecca Goodman, et al., filed on Mar. 26, 2002, and in copending U.S. patent application Ser. No. 10/108,217, entitled, "System for Ranking Card Reissue Transactions," by Jim K. Prendergast, et al., filed on Mar. 26, 2002, which applications are herein incorporated by reference in their entirety. These examples should not be considered limiting. Other examples might include a credit application process, wherein a customer may be requesting a higher credit limit.

Figure 7:
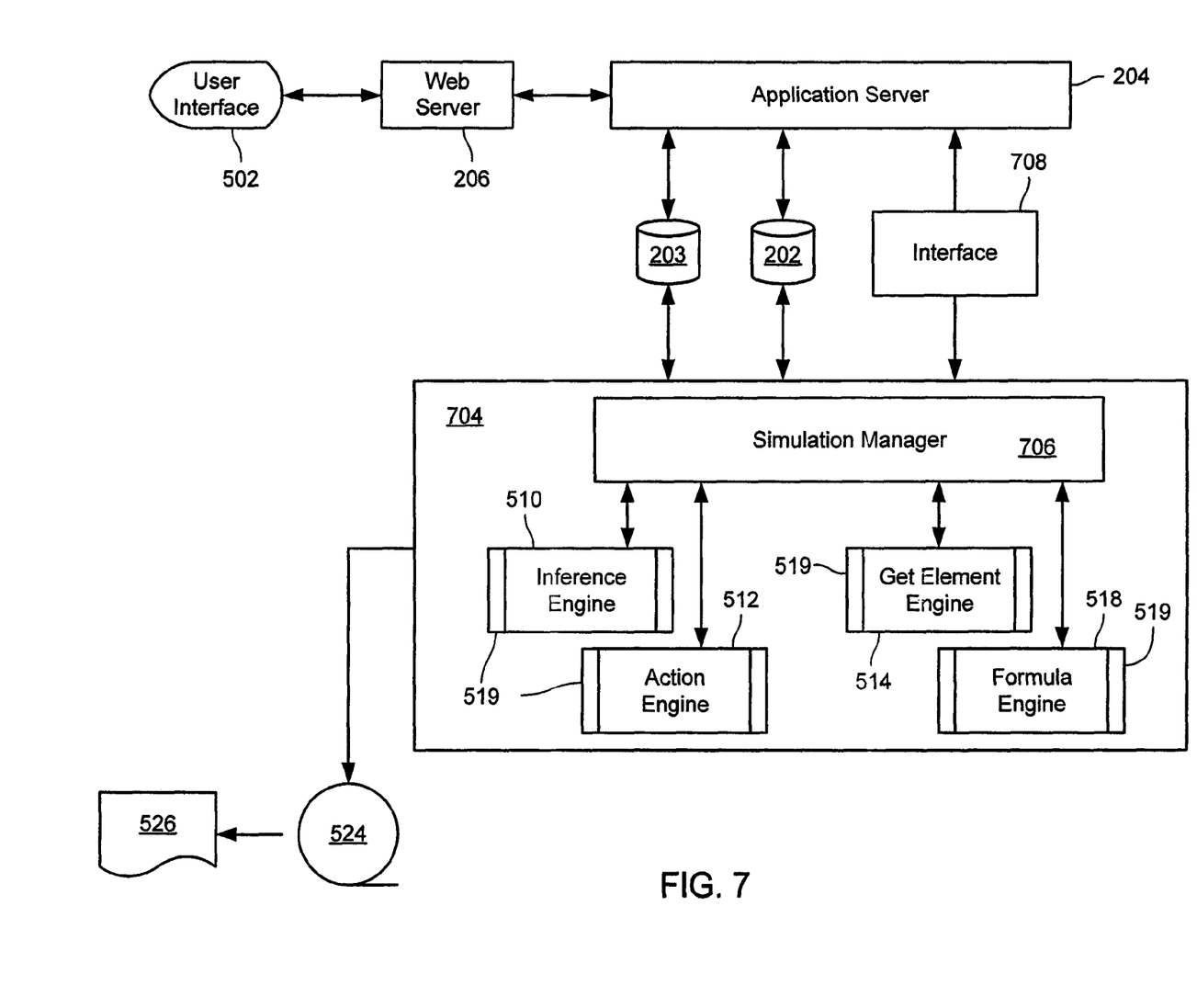
FIG. 7 is a simulation environment according to embodiments of the present invention.

Having described the processes for creating and using rules to process customer account and transaction data, attention is directed to FIG. 7 for a discussion of a process for simulating one or more rules during the rule creation process. FIG. 7 illustrates a simulation environment 700 having many of the same elements as the processing environment 500 of FIG. 5. As with the processing environment 500 of FIG. 5, the simulation environment 700 may reside on the application server 204 or other suitable computing environment. The simulation environment 700 includes a simulation area 704 having many of the engines discussed previously with respect to the processing area 504. Additionally, the simulation area 704 includes a simulation manager 706 that controls the simulation process and provides useful information relating to the sequence of activities in the simulation process, as will be explained in more detail hereinafter. The simulation environment also includes an interface 708 that provides information relating to the simulation process to a user, such as a client.

Using the simulation environment 700, clients may observe the effect of a particular rule on actual customer account and transaction data. A business rule to be simulated is loaded from the rules database 202 into the simulation area 704. The simulation manager 706 controls a step-by-step processing sequence based on the rule being simulated. As will be explained further below with reference to FIGS. 8A and 8B, the calculations, data calls, attribute updates, logical results, and the like, are presented to the user. Thus, the user is able to debug, modify, and optimize rules being incorporated into a policy.

In order to provide a high degree of realism, the simulation environment 700 may use real customer account and transaction data to perform the simulations. In some embodiments, users may request specific data sets. In other embodiments, the simulation environment 700 uses particular default data, such as "yesterday's data." Data is accessed by the engines through each engine's data access layer 519. Some embodiments of the present invention allow users to select either multiple customer accounts for simulation purposes or a single, specified customer account.

In some embodiments of the present invention, such as the simulation environment 700 shown in FIG. 7, the simulation area 704 does not include a put engine 516. That is because the put engine 516 updates account attributes in response to business rules. However, during simulation, it is desirable to not update account attributes. Rather, information is provided to the user via the interface 708 that tells the user what is happening or what has happened during the simulation.

Figure 8A:
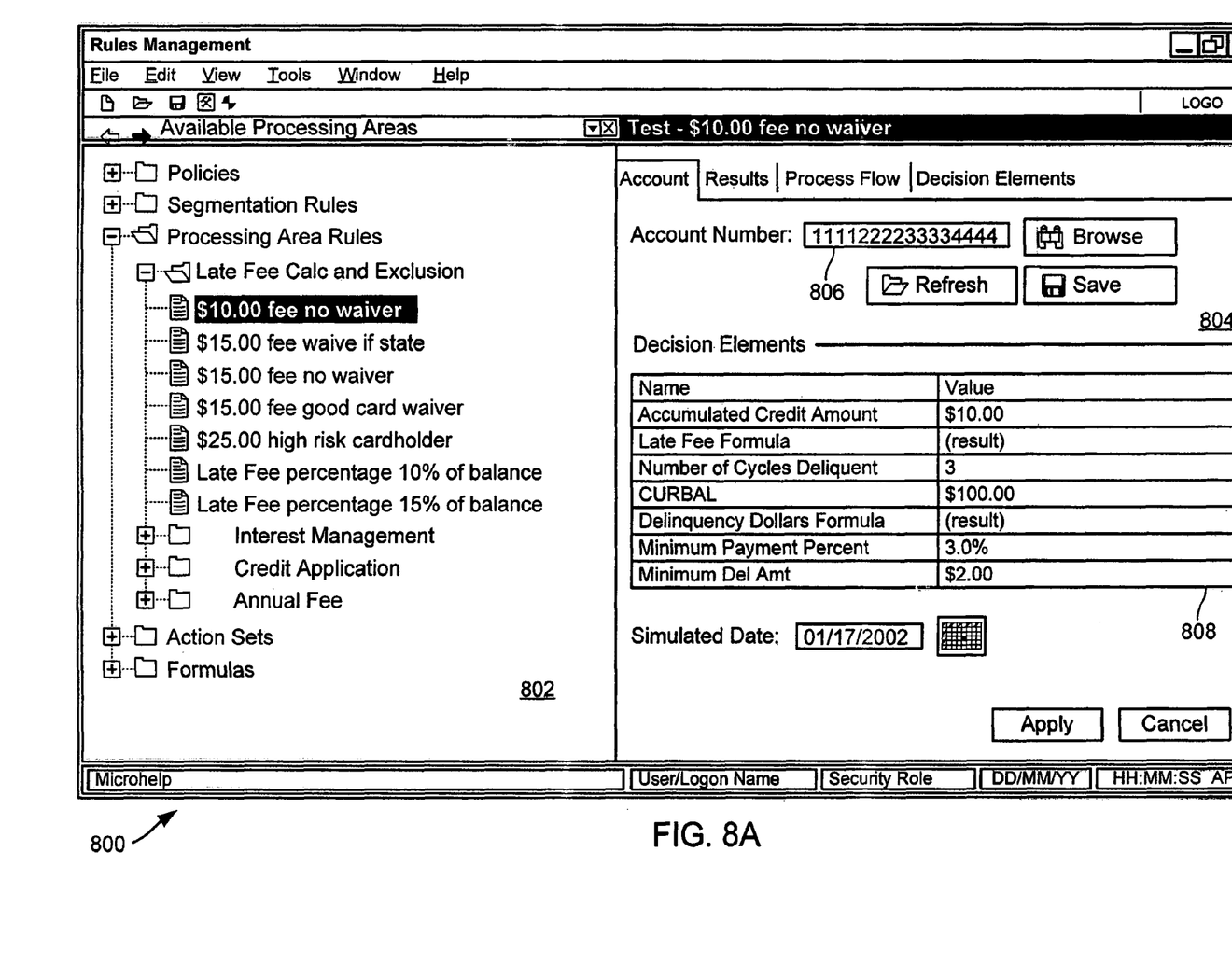
FIGS. 8A and 8B are first and second simulation screen displays, respectively, that may result from the simulation environment of FIG. 7.

Attention is directed to FIG. 8A, which illustrates a first simulation screen display 800 in one non-limiting example of the present invention. The screen display 800 includes a rules window 802 that displays the rule hierarchy as previously discussed. In the rules window, a user may select a particular rule for simulation. The screen display 800 also includes a simulation window 804 that displays information relating to the rule being simulated. A user may specify a particular customer's account upon which to base the simulation by entering the account in the account field 806. A decision elements table 808 lists the elements, account attributes, and formula results relating to the rule being simulated.

Figure 8B:
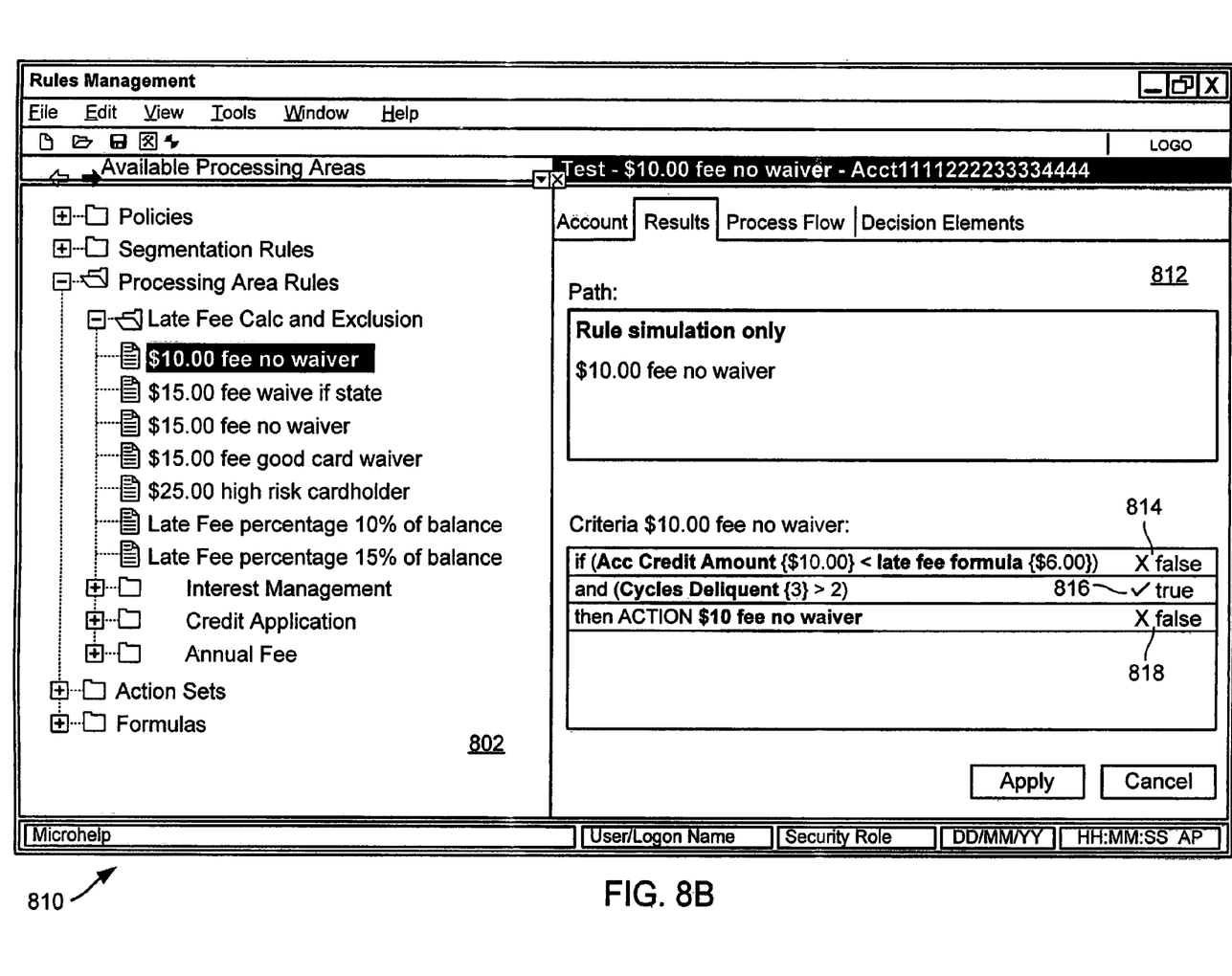

Attention is directed to FIG. 8B, which illustrates a second screen display 810 in a simulation process. In a results window 812, a user is able to observe the results of the logical statements relating to the rule. Thus, in this example, the user is able to observe the results of the logical statements for the "$10 fee no waiver" rule discussed previously with respect to FIG. 1. The first logical statement 814 results in a false condition, while the second logical statement 816 results in a true condition based on the data for the account upon which the simulation is based. Because the first and second logical statements 814, 816 are joined by an "and" conjunction, the result of the rule is false, meaning that the action is not taken, as can be seen from the action statement 818. This is but one example of the simulation process of the present invention, and many other examples are possible and evident, in light of the disclosure herein, to those having skill in the art. Therefore, this example is not to be considered limiting.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to providing bankcard services. For example, the present invention may be used to process utility bills, phone bills, mortgage statements, brokerage account statements, and the like. Accordingly, the above description should not be taken as limiting the scope of the invention, which is defined in the following claims.

What is claimed is:

1. A computer-readable medium having instructions embodied therein that, when executed by a computer, cause the computer to provide a bankcard program user interface, comprising the steps of:
    defining an event related to bankcard processing, wherein the means for defining the event comprises means for defining the event to be a new processing day;
    defining a condition related to a bankcard account, wherein the condition includes a logical expression using at least one element derived from one or more account attributes of a bankcard account;
    defining an action related to a bankcard account, the action to be taken based on the condition upon the occurrence of the event; and causing the event, the condition, and the action to be stored as a business rule;
    wherein the steps are programmed to be rendered on a display of a user in response to a request from the user to a host computer system of a bankcard processor.

2. The computer-readable medium of claim 1, wherein the step of defining an event comprises selecting the event from a list of predefined events.

3. The computer-readable medium of claim 1, wherein the event comprises a selection from the group consisting of statement processing, monetary posting, non-monetary posting, monetary adjustment, specified day, account transfer, and account creation.

4. The computer-readable medium of claim 1, wherein the step of defining a condition comprises selecting the condition from a list of predefined conditions.

5. The computer-readable medium of claim 1, wherein the step of defining an action comprises selecting the action from a list of predefined actions.

6. The computer-readable medium of claim 1, wherein the action comprises a selection from the group consisting of set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a master file field, call another rule, assign or remove an identifier, set account limits or thresholds, insert information into a statement, print a message, generate a plastic, and change a credit line.

7. The computer-readable medium of claim 1, wherein the bankcard program user interface further comprises selecting a business rule from a list of pre-defined business rules.

8. A computer-readable medium having instructions embodied therein that, when executed by a computer, cause the computer to provide a bankcard program user interface, comprising the steps of:
 a selection area configured to receive a user selection of an event related to bankcard processing;
 receiving a user selection of a condition related to a bankcard account, wherein the condition includes a logical expression using at least one element derived from one or more account attributes of a bankcard account;
 receiving a user selection of an action related to a bankcard account, the action to be taken based on the condition upon the occurrence of the event, wherein the selection area configured to receive a user selection of an action includes a selection that defines the action to be sending a letter to a bankcard account holder; and
 receiving a user selection to cause the event, the condition, and the action to be stored as a business rule;
 wherein the steps are programmed to be rendered on a display of a user in response to a request from the user to a host computer system of a bankcard processor.

9. The computer-readable medium of claim 8, wherein receiving a user selection of an event comprises receiving a user selection of an event from a list of predefined events.

10. The computer-readable medium of claim 8, wherein the event comprises a selection from the group consisting of statement processing, new processing day, monetary posting, non-monetary posting, monetary adjustment, specified day, account transfer, and account creation.

11. The computer-readable medium of claim 8, wherein the receiving a user selection of a condition comprises receiving a user selection of a condition from a list of predefined events.

12. The computer-readable medium of claim 8, wherein the one or more account attributes are selected from a group consisting of state of residence, base interest rate, current, previous, and last balance, delinquency, client-defined fields, payment history, and promotional information.

13. The computer-readable medium of claim 8, wherein the receiving a user selection of an action comprises receiving a user selection of an action from a list of predefined actions.

14. The computer-readable medium of claim 8, wherein the bankcard program user interface further comprises receiving a user selection of a business rule from a list of pre-defined business rules.

15. A bankcard design system, comprising:
 a database for storing business rules;
 a computer, processor for processing account data and transaction data using business rules; and
 an electronic storage arrangement for causing a user interface to be rendered on a display of a user, the user interface comprising:
   a selection area configured to receive a user selection of an event related to bankcard processing;
   a selection area configured to receive a user selection of a condition related to a bankcard account, wherein the condition includes a logical expression using at least one element derived from one or more account attributes of a bankcard account, at least one attribute comprising a bankcard account holder's state of residence;
   a selection area configured to receive a user selection of an action related to a bankcard account, the action to be taken based on the condition upon the occurrence of the event; and
   a selection arrangement configured to receive a user selection to cause the event, the condition, and the action to be stored as a business rule.

16. The bankcard design system of claim 15, wherein the selection area configured to receive a user selection of an event comprises a selection arrangement configured to receive a user selection of an event from a list of predefined events.

17. The bankcard design system of claim 15, wherein the event comprises a selection from the group consisting of statement processing, new processing day, monetary posting, non-monetary posting, monetary adjustment, specified day, account transfer, and account creation.

18. The bankcard design system of claim 15, wherein the selection area configured to receive a user selection of a condition comprises a selection arrangement configured to receive a user selection of a condition from a list of predefined events.

19. The bankcard design system of claim 15, wherein the one or more account attributes are selected from a group consisting of, base interest rate, current, previous, and last balance, delinquency, client-defined fields, payment history, and promotional information.

20. The bankcard design system of claim 15, wherein the selection area configured to receive a user selection of an action comprises a selection arrangement configured to receive a user selection of an action from a list of predefined actions.

21. The bankcard design system of claim 15, wherein the action comprises a selection from the group consisting of set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a masterfile field, call another rule, assign or remove an identifier, set account limits or thresholds, insert information into a statement, print a message, generate a plastic, and change a credit line.

22. A method of processing bankcard account and transaction data, comprising:
 receiving at a host computer system a request from a user to define a bankcard program;
 causing a user interface to be rendered on a computer of the user, the user interface, comprising:
 a selection area configured to receive a user selection of an event related to bankcard processing;

a selection area configured to receive a user selection of a condition related to a bankcard account, wherein the condition includes a logical expression using at least one element derived from one or more account attributes of a bankcard account;

a selection area configured to receive a user selection of an action related to a bankcard account, the action to be taken based on the condition upon the occurrence of the event;

a selection arrangement configured to receive a user selection to cause the event, the condition, and the action to be stored as a business rule; and a selection arrangement configured to receive a user selection of a business rule from a list of pre-defined business rules;

receiving a selection for at least one business rule;

collecting account data;

collecting transaction data;

processing the account and transaction data using the at least one business rule; and outputting a result of the processing.

23. The method of processing bankcard account and transaction data of claim 22, wherein the selection area configured to receive a user selection of an event comprises a selection arrangement configured to receive a user selection of an event from a list of predefined events.

24. The method of processing bankcard account and transaction data of claim 22, wherein the event comprises a selection from the group consisting of statement processing, new processing day, monetary posting, non-monetary posting, monetary adjustment, specified day, account transfer, and account creation.

25. The method of processing bankcard account and transaction data of claim 22, wherein the selection area configured to receive a user selection of a condition comprises a selection arrangement configured to receive a user selection of a condition from a list of predefined events.

26. The method of processing bankcard account and transaction data of claim 22, wherein the one or more account attributes are selected from a group consisting of state of residence, base interest rate, current, previous, and last balance, delinquency, client-defined fields, payment history, and promotional information.

27. The method of processing bankcard account and transaction data of claim 22, wherein the selection area configured to receive a user selection of an action comprises a selection arrangement configured to receive a user selection of an action from a list of predefined actions.

28. The method of processing bankcard account and transaction data of claim 22, wherein the action comprises a selection from the group consisting of set a fee value, send a letter, calculate a finance charge, calculate average daily balance, waive fees, increase or decrease fees, reinstate an item, allocate and distribute payments across monetary fields, satisfy minimum payment due, process pay ahead, accumulate monetary information, update a masterfile field, call another rule, assign or remove an identifier, set account limits or thresholds, insert information into a statement, print a message, generate a plastic, and change a credit line.

* * * * *